Patented Aug. 12, 1952

2,606,914

UNITED STATES PATENT OFFICE 2,606,914

$\Delta^{8(9),14}$-ANDROSTADIENES AND METHOD OF PREPARING THE SAME

Seymour Bernstein, Pearl River, N. Y., and Dominic J. Giancola, Jersey City, N. J., assignors to American Cyanamid Company, New York, N. Y., a corporation of Maine No Drawing. Application March 22, 1951, Serial No. 217,082

6 Claims. (Cl. 260—397.5)

This invention relates to new chemical compounds. More particularly, it relates to $\Delta^{8(9),14}$-androstadienes and methods of preparing the same.

The phenomenal success reported by Kendall and others in the use of certain hormones in the treatment of arthritis and related diseases has greatly increased the general interest in the steroid field. One of the compounds found to be highly active is cortisone which occurs naturally in the adrenal cortex. Cortisone is usually described chemically as $\Delta^{4,5}$-3,11,20-triketo-17$\alpha$, 21-dihydroxy pregnene. Other compounds structurally related to cortisone have been reported to have cortisone-like activity and to be useful in the treatment of pathological conditions broadly classified as rheumatic diseases. This product has also been found useful in the treatment of severe burns.

We have found that certain substituted $\Delta^{8(9),14}$-androstadienes may be useful in preparing physiologically active compounds. The compounds of the present invention can be prepared by a process which may be graphically illustrated as follows:

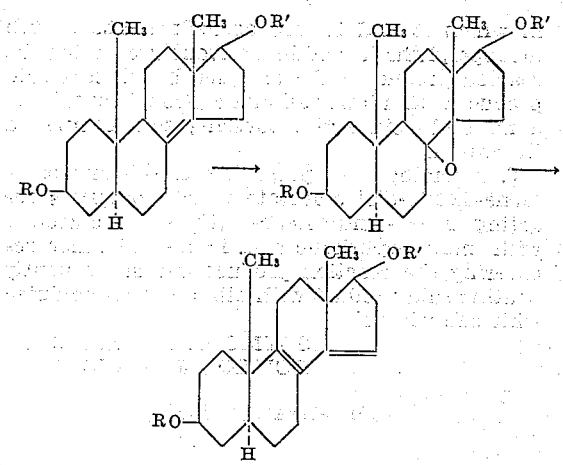

in which R and R' are members of the group consisting of hydrogen, benzoyl and lower alkyl carbonyl radicals.

These compounds are crystalline with moderately high melting points and are soluble in the usual organic solvents. They can be recrystallized from solvents such as lower aliphatic alcohols.

The compounds of the present invention are prepared by reacting a 3,17-disubstituted-$\Delta^{8(14)}$-androstene with monoperphthalic acid or perbenzoic acid in the presence of a solvent. The solvents found useful in this step of the process are those such as dimethyl ether, diethyl ether, diisopropyl ether and the like. The product obtained is the 8:14 oxido derivative which on treatment with acidified alcohols gives the doubly unsaturated $\Delta^{8(9),14}$-androstadiene.

The intermediates useful in the process of the present invention are, in general, new compounds. A method of preparing these compounds is described in a copending application of Bernstein, Serial No. 168,164, filed June 14, 1950, now Patent No. 2,588,608. A method of preparing these intermediates from known starting materials is also described in the examples hereinafter.

The preferred intermediate in carrying out the process of the present invention is the $\Delta^{8(14)}$-androstene-3$\beta$, 17$\beta$-diol diacetate. Other intermediates can be used in which R and R' of the general formula may be hydrogen, propionyl, butyryl, benzoyl, and the like.

The process for the oxidation step in the present invention may be carried out at a temperature within the range of about 30° C. to about 60° C. The preferred temperature is usually the boiling point of the particular solvent used since the reaction is preferably carried out under refluxing conditions. In the acidification the temperature is preferably from about 50° C. to 110° C.

The compounds of the present invention are useful in the field of pharmaceuticals and may serve as intermediates in the preparation of compounds having cortisone-like activity.

The invention will be described in greater detail in the following example wherein representative compounds within the scope of the general reaction are prepared.

*Example*

To 11.96 mg. of platinum oxide catalyst in 5 ml. of glacial acetic acid previously reduced with hydrogen is added 73.77 mg. of $\Delta^{5,7}$-androstadiene-3$\beta$,17$\beta$-diol diacetate as prepared by Butenandt et al., Ber. 71; 1316 (1938). The hydrogenation is carried out to constant reading. After one-half hour 4.54 ml. (standard temperature and pressure) of hydrogen is consumed and after 1¼ hours, 4.62 ml. (S. T. P.) of hydrogen. The calculated hydrogen for one double bond is 4.53 ml. (S. T. P.). The catalyst is removed by filtration. Water is added, and the resulting precipitate is collected after standing. It is washed with a copious amount of water and has a melting point of 134°–136° C. Recrystallization to constant melting point from dilute methanol gives 52 mg. of analytically pure $\Delta^{8(14)}$-androstene-3β,17β-diol diacetate having a melting point of 136.5–138° C.

One hundred and fifty milligrams of $\Delta^{8(14)}$-androstene-3β,17β-diol diacetate in 15 ml. of dried absolute ether was treated with 0.146 g. of monoperphthalic acid (2.3 ml. of stock ether solution which contained 0.0635 g. of peracid per ml.). The mixture was refluxed on the steam bath for 6.5 hours. The ether was removed under reduced pressure; the residue was digested with anhydrous chloroform and the solid (phthalic acid) was removed by filtration. The chloroform was removed under reduced pressure and the residue $\Delta^{8(14)}$-androstene-3β,17β-diol diacetate oxide was recrystallized from dilute acetone, and dilute methanol, melting point 187°–188° C.

Three hundred and thirty milligrams of $\Delta^{8(14)}$-androstene-3β,17β-diol diacetate oxide in 20 ml. of alcohol was heated to reflux when a small amount of dilute sulfuric acid was added dropwise. The mixture was heated on the steam bath for 15 minutes. Addition of water gave an oily product which was worked up in ether in the usual manner. Removal of the ether gave an oil which was refluxed one-half hour with 5 ml. of acetic anhydride. The diacetate was worked up in ether in the usual manner. Evaporation of the ether gave a residue which on recrystallization from dilute methanol gave pure $\Delta^{8(9)14}$-androstadiene-3β,17β-diol diacetate, melting point 106°–108.2° C., weight 0.18 g., $\lambda_{max.}^{abs. alc.}$ 245 mμ, ε245 = 18700

We claim:

1. Compounds of the group having the general formula:

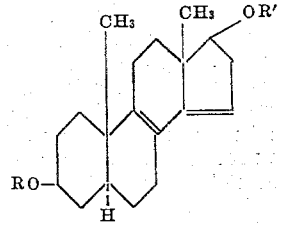

in which R and R' are members of the group consisting of hydrogen, benzoyl and a lower alkyl carbonyl radical.

2. A 3,17-di-(lower alkyl carbonyloxy)-$\Delta^{8(9),14}$-androstadiene.

3. $\Delta^{8(9),14}$-androstadiene-3β,17β-diol diacetate.

4. A method of preparing compounds having the general formula:

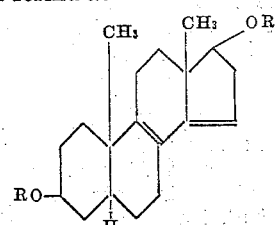

in which R and R' are members of the group consisting of hydrogen, benzoyl and lower alkyl carbonyl radicals which comprises reacting a compound having the formula

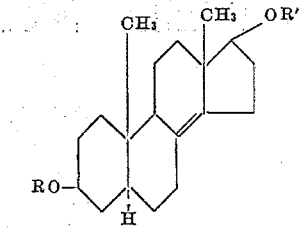

in which R and R' are as defined above with a member of the group consisting of monoperphthalic acid and perbenzoic acid in a solvent, recovering the reaction product therefrom and subsequently treating said product with a lower aliphatic alcohol containing a mineral acid and recovering said compound therefrom.

5. A method of preparing compounds having the formula:

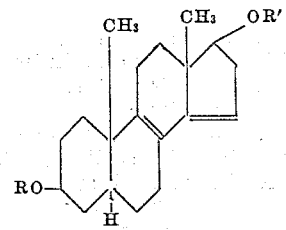

in which R and R' are lower alkyl carbonyl radicals which comprises reacting a compound having the formula:

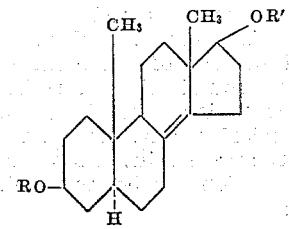

in which R and R' are as defined above with monoperphthalic acid in a solvent, recovering the reacted product and subsequently treating said product with a lower aliphatic alcohol containing a mineral acid and recovering said compound therefrom.

6. A method of preparing $\Delta^{8(9),14}$-androstadiene-3β,17β-diol diacetate which comprises reacting $\Delta^{8(14)}$-androstene-3β,17β-diol diacetate with monoperphthalic acid in diethyl ether recovering the reaction product and subsequently heating said product with ethyl alcohol acidified with sulfuric acid.

SEYMOUR BERNSTEIN.
DOMINIC J. GIANCOLA.

No references cited.